(12) United States Patent
Fänge et al.

(10) Patent No.: US 11,310,339 B2
(45) Date of Patent: Apr. 19, 2022

(54) SELECTING A POSITIONING TECHNIQUE BASED ON THE ACCURACY

(71) Applicant: SONY NETWORK COMMUNICATIONS EUROPE B.V., Hoofddorp (NL)

(72) Inventors: Thomas Fänge, Lund (SE); Mattias Falk, Lund (SE); Hannes Bergkvist, Helsingborg (SE)

(73) Assignee: SONY NETWORK COMMUNICATIONS EUROPE B.V., Hoofddorp (NL)

(*) Notice: Subject to any disclaimer, the term of this patent is extended or adjusted under 35 U.S.C. 154(b) by 0 days.

(21) Appl. No.: 16/967,055

(22) PCT Filed: Feb. 5, 2019

(86) PCT No.: PCT/EP2019/052755
§ 371 (c)(1),
(2) Date: Aug. 3, 2020

(87) PCT Pub. No.: WO2019/149957
PCT Pub. Date: Aug. 8, 2019

(65) Prior Publication Data
US 2021/0044670 A1    Feb. 11, 2021

(30) Foreign Application Priority Data
Feb. 5, 2018   (SE) .................................. 1830036-8

(51) Int. Cl.
*H04W 24/00*    (2009.01)
*H04L 67/306*   (2022.01)
*H04W 4/029*    (2018.01)
*H04L 67/01*    (2022.01)

(52) U.S. Cl.
CPC ............ *H04L 67/306* (2013.01); *H04L 67/42* (2013.01); *H04W 4/029* (2018.02)

(58) Field of Classification Search
CPC ....... H04L 67/306; H04L 67/42; H04W 4/029
See application file for complete search history.

(56) References Cited

U.S. PATENT DOCUMENTS

| | | |
|---|---|---|
| 2007/0049267 A1 | 3/2007 | Kota et al. |
| 2009/0219209 A1 | 9/2009 | Bush et al. |
| 2010/0291947 A1 | 11/2010 | Annamalai |
| 2012/0112958 A1 | 5/2012 | Alizadeh-Shabdiz et al. |

(Continued)

FOREIGN PATENT DOCUMENTS

| | | |
|---|---|---|
| CN | 106056375 A | 10/2016 |
| EP | 1443791 A1 | 8/2004 |

OTHER PUBLICATIONS

International Search Report and Written Opinion of the International Searching Authority, International Application No. PCT/EP2019/052755, dated Jun. 11, 2019, 18 pp.

*Primary Examiner* — Erika A Washington
(74) *Attorney, Agent, or Firm* — Myers Bigel, P.A.

(57) ABSTRACT

A method includes obtaining a benchmark of an accuracy of at least one of a direct positioning technique or an indirect positioning technique for positioning of a mobile device. The method also includes, depending on the benchmark, selecting between positioning of the mobile device using the direct positioning technique and the indirect positioning technique.

12 Claims, 6 Drawing Sheets

(56) References Cited

U.S. PATENT DOCUMENTS

| | | | |
|---|---|---|---|
| 2013/0033999 A1 | 2/2013 | Siomina et al. | |
| 2015/0149091 A1* | 5/2015 | Milton | H04W 4/029 |
| | | | 702/2 |
| 2015/0195810 A1* | 7/2015 | Sun | G01C 21/206 |
| | | | 455/456.1 |

* cited by examiner

SELECTING A POSITIONING TECHNIQUE BASED ON THE ACCURACY

CROSS REFERENCE TO RELATED APPLICATIONS

This application is a 35 U.S.C. § 371 national stage application of PCT International Application No. PCT/EP2019/052755, filed on Feb. 5, 2019, which itself claims the benefit of and priority to Swedish Application No. 1830036-8, filed Feb. 5, 2018, the contents of both of which are incorporated herein by reference in their entirety. The above-referenced PCT International Application was published in the English language as International Publication No. WO 2019/149957 A1 on Aug. 8, 2019.

TECHNICAL FIELD

Various examples of the invention generally relate to facilitating positioning of a UE. Various examples specifically relate to selecting between multiple positioning techniques for positioning of the UE, including an indirect positioning technique and a direct positioning technique.

BACKGROUND

Various positioning techniques are known in the art for determining position data indicative of a location of a mobile device (UE). For example, the position data may be indicative of the geographical longitude and/or latitude. For example, the position data may be indicative of the position in a reference coordinate system. For example, the position data may be indicative of a distance with respect to one or more reference points such as access points, etc.

One example of a positioning technique is the fingerprinting positioning technique. See, e.g.: Frattasi, Simone, and Francescantonio Della Rosa. Mobile positioning and tracking: from conventional to cooperative techniques. John Wiley & Sons, 2017, pages 268 and 269. Fingerprinting positioning techniques typically rely on a mapping of a receive signal strength (RSS) to locations within a coverage area. Empirical measurements may be used to populate a respective location repository of the fingerprinting positioning technique. Alternatively or additionally, it would be possible to populate the location repository based on models of path loss of signals transmitted by nearby access points (APs). Sometimes, interpolation between measurements is used in order to increase spatial resolution. Population of the location repository is associated with a mapping phase. Use of the data included in the location repository for positioning is associated with an online phase.

It has been observed that fingerprinting positioning techniques face certain restrictions and drawbacks. For example, it has been observed that the mapping phase (sometimes also referred to as offline phase or calibration phase) can be laborious and time-consuming. Furthermore, due to temporal drifts in the environment, there is a tendency that entries in the location repository become outdated quickly. In other words, a freshness of the entries of the location repository can sometimes be insufficient for providing accurate positioning. Even small changes in the environment can have a significant impact on the RSS observed at a given location and, hence, reduce the accuracy of the fingerprinting positioning technique.

SUMMARY

Therefore, a need exists for advanced positioning techniques. Specifically, a need exists for advanced positioning techniques which overcome or mitigate at least some of the above-identified restrictions and drawbacks.

This need is met by the features of the independent claims. The features of the dependent claims define embodiments.

A method includes obtaining a benchmark of an accuracy of at least one of a direct positioning technique and an indirect positioning technique for positioning of a mobile device. The method also includes selecting between positioning of the mobile device using the direct positioning technique and the indirect positioning technique depending on the benchmark.

A computer program includes program code. The program code can be executed by at least one processor. Executing the program code causes the at least one processor to perform a method. The method includes obtaining a benchmark of an accuracy of at least one of a direct positioning technique and an indirect positioning technique for positioning of a mobile device. The method also includes selecting between positioning of the mobile device using the direct positioning technique and the indirect positioning technique depending on the benchmark.

A computer program product includes program code. The program code can be executed by at least one processor. Executing the program code causes the at least one processor to perform a method. The method includes obtaining a benchmark of an accuracy of at least one of a direct positioning technique and an indirect positioning technique for positioning of a mobile device. The method also includes selecting between positioning of the mobile device using the direct positioning technique and the indirect positioning technique depending on the benchmark.

A device includes control circuitry. The control circuitry is configured to obtain a benchmark of an accuracy of at least one of a direct positioning technique and an indirect positioning technique for positioning of a mobile device. The control circuitry is further configured to select between positioning of the mobile device using the direct positioning technique and the indirect positioning technique depending on the benchmark.

A method of operating a system includes deploying a first plurality of mobile devices. The first plurality of mobile devices is configured to employ a direct positioning technique and an indirect positioning technique. The method also includes deploying a second plurality of mobile devices. The second plurality of mobile devices is configured to employ a further direct positioning technique. The method further includes benchmarking at least one of the direct positioning technique and the indirect positioning technique based on the further direct positioning technique.

A computer program includes program code. The program code can be executed by at least one processor. Executing the program code causes the at least one processor to perform a method of operating a system. The method includes deploying a first plurality of mobile devices. The first plurality of mobile devices is configured to employ a direct positioning technique and an indirect positioning technique. The method also includes deploying a second plurality of mobile devices. The second plurality of mobile devices is configured to employ a further direct positioning technique. The method further includes benchmarking at least one of the direct positioning technique and the indirect positioning technique based on the further direct positioning technique.

A computer program product includes program code. The program code can be executed by at least one processor. Executing the program code causes the at least one processor to perform a method of operating a system. The method includes deploying a first plurality of mobile devices. The first plurality of mobile devices is configured to employ a direct positioning technique and an indirect positioning technique. The method also includes deploying a second plurality of mobile devices. The second plurality of mobile devices is configured to employ a further direct positioning technique. The method further includes benchmarking at least one of the direct positioning technique and the indirect positioning technique based on the further direct positioning technique.

A device includes control circuitry. The control circuitry is configured to deploy a first plurality of mobile devices. The first plurality of mobile devices is configured to employ a direct positioning technique and an indirect positioning technique. The control circuitry is also configured to deploy a second plurality of mobile devices. The second plurality of mobile devices is configured to employ a further direct positioning technique. The control circuitry is further configured to benchmark at least one of the direct positioning technique and the indirect positioning technique based on the further direct positioning technique.

The aspects and embodiments described above may be combined with each other.

DETAILED DESCRIPTION OF EMBODIMENTS

Figure 1:
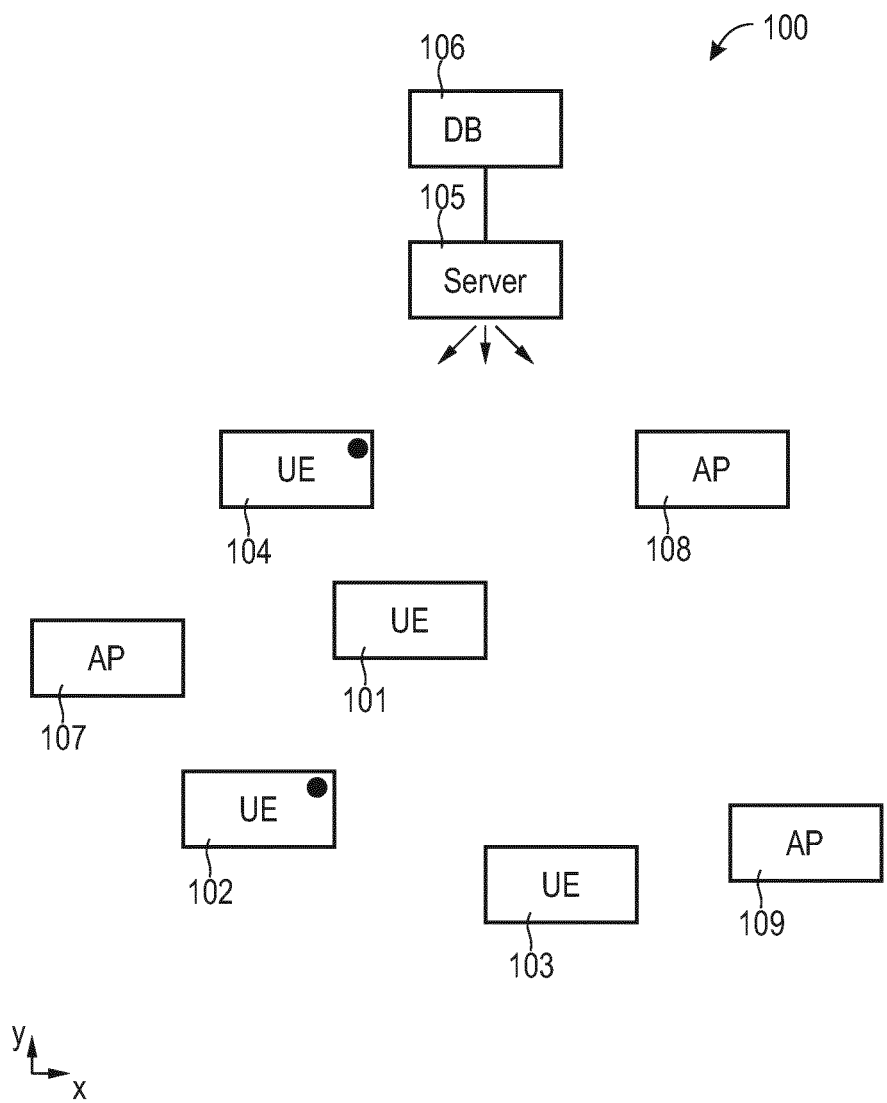
FIG. 1 schematically illustrates a system including multiple deployed UEs, APs of a network, a server, and a location repository according to various examples.

Hereinafter, exemplary embodiments of the invention will be described in greater detail with respect to the figures. Corresponding elements are denoted with same or corresponding reference numerals. The embodiments are described as examples only and are not intended to limit the scope of the claims. Functional blocks may be implemented in hardware and/or software and/or firmware.

Hereinafter, techniques facilitating positioning of a UE are described. The techniques described herein facilitate positioning of the UE at a high accuracy or at least at a known accuracy. Specifically, the techniques described herein facilitate positioning of the UE and providing a benchmark for the accuracy of the respective positioning. Thereby, the accuracy of the positioning of the UE may be determined in some scenarios.

Hereinafter, techniques are described which facilitate selection of one or more positioning techniques for positioning of the UE. For example, the selection may be implemented between two, three, or more positioning techniques. One or more positioning techniques can be selected depending on a benchmark of the accuracy of one or more positioning techniques and, optionally, one or more further positioning techniques. The benchmark may provide a quantitative measure of the accuracy. For example, the benchmark may indicate whether the accuracy is high or low. The benchmark may, alternatively or additionally, also indicate whether the accuracy in unknown or only known at comparably large error margins. This helps to select one or more appropriate positioning techniques, e.g., depending on a required accuracy and, optionally, one or more further decision criteria such as state of charge of a battery, mobility of the UE, etc.

According to examples, a benchmark of the accuracy of at least one of a direct positioning technique and an indirect positioning technique is obtained. Then, a selection between positioning of the UE using the direct positioning technique and the indirect positioning technique is implemented depending on the benchmark.

For example, the indirect positioning technique may rely on measurements of an environmental topology for comparison with entries of a location repository. This may define an online phase of the indirect positioning technique. The location repository may include predetermined measurements or models of the environmental topology. Thereby, a mapping of the measurements on the entries of the location repository can be implemented; each entry of the location repository may then be associated with respective position data indicative of a respective location. Thereby, it is possible to obtain the position data based on such mapping. As will be appreciated, the indirect positioning technique relies on a-priori knowledge on the environmental topology. Hence, the positioning technique is indirect, because a comparison between the measurements and the a-priori knowledge is required. It is not possible to use the indirect positioning technique for ab initio positioning of the UE, without any a-priori knowledge. Different implementations of the indirect positioning technique are available. Depending on the particular implementation of the indirect positioning technique—e.g., as Simultaneous Localization and Mapping (SLAM) or fingerprinting—different observations on the environmental topology may be taken. For example, in a fingerprinting positioning technique, the RSS may be measured to take observations on radiofrequency propagation through the environment. Differently, for a SLAM positioning technique, the 2D or 3D appearance of the environment may be observed by taking pictures, employing ranging measurements, etc. Such measurements may then be compared to the location repository.

The direct positioning technique—in contrast to the indirect positioning technique—does not rely on a-priori knowledge on the environment within which the UE is to be positioned. Rather, the direct positioning technique may use ab initio measurements to determine position data indicative of the location of the UE. Example positioning measurements include: time of flight; path loss; and angle of arrival. Thereby, it would be possible to determine a distance and/or orientation of the UE with respect to certain reference positions, e.g., of APs. Here, it is not required to use a-priori knowledge of the topology of the environment through which corresponding radio frequency signals travel, e.g., between the UE and one or more APs. The direct positioning technique may use a technology which is selected from the group comprising: Bluetooth® low energy; ultrawideband; WiFi. For example, multilateration of the RSS can be employed based on Bluetooth low-energy beacons or any other appropriate reference radio frequency signal. Examples in this regard are described, e.g., in Frattasi, Simone, and Francescantonio Della Rosa. *Mobile positioning and tracking: from conventional to cooperative techniques*. John Wiley & Sons, 2017: section 8.4.1.2 on pages 215-217. Ultrawideband technology for positioning techniques are described in Frattasi, Simone, and Francescantonio Della Rosa. *Mobile positioning and tracking: from conventional to cooperative techniques*. John Wiley & Sons, 2017: section 8.4.1.1 on pages 214 and 215. WiFi or WLAN is described by IEEE 802.11x.

By implementing the selection between positioning of the UE using the direct positioning technique and the indirect positioning technique, it becomes possible to ensure a certain accuracy when positioning the UE. For example, if the benchmark indicates an insufficient accuracy of the indirect positioning technique, the direct positioning technique may be selected. For example, if the benchmark indicates large error margins for the accuracy of the indirect positioning technique, the direct positioning technique may be selected. In a comparable manner, if the benchmark indicates low or uncertain accuracy of the direct positioning technique, the indirect positioning technique may be selected. Situation-aware selection of the appropriate positioning technique becomes possible.

As a general rule, one or more further decision criteria may be taken into account when selecting between positioning of the UE using the direct positioning technique and the indirect positioning technique—in alternative or in addition to the benchmark. Examples of such further decision criteria include, but are not limited to: location of the UE; and/or state of charge of the UE; and/or mobility of the UE; etc. Thereby, it becomes possible to select the appropriate positioning technique not only in view of accuracy, but also in view of other criteria of importance for operation of the UE. For example, the power consumption may be tailored.

As a general rule, such selection between positioning of the UE using the direct positioning technique and the indirect positioning technique may rely on logic fully or partly residing at the UE and/or may rely on logic fully or partly residing at a server communicating with the UE. The server may provide positioning functionality to a plurality of UEs. Hence, the server may be labelled positioning server.

According to the techniques described herein, various options are available for obtaining the benchmark of the accuracy. In some scenarios, the benchmark may be obtained by a UE-constrained or UE-centric determination.

According to a first option, the UE may perform a measurement and determine the benchmark based on the measurement. In further examples, the benchmark may be obtained—alternatively or additionally to UE-centric determination—by server-centric determination. For example, the server may trigger one or more measurements obtained by one or more further UEs in the proximity of the UE for which positioning is desired. This may be helpful where (A) it can be determined at high accuracy that the one or more further UEs are in the proximity of the UE, and where (B) the location of the one or more further UEs can be determined at the high accuracy, e.g., by at least one further direct positioning technique of a nominally high accuracy that may not be available to the UE (hereinafter, referred to as high-accuracy direct positioning technique). Specifically, the high-accuracy positioning technique may have an accuracy which is higher than the accuracy than the direct positioning technique available to the UE (hereinafter, referred to as low-accuracy direct positioning technique). Then, by positioning the one or more further UEs, it becomes possible to conclude back on a location of the UE which can be used to obtain the benchmark of the accuracy of the direct positioning technique and/or the indirect positioning technique available to the UE. A respective comparison of corresponding reference position data may be implemented. As will be appreciated, the reference position data of the high-accuracy direct positioning technique can serve as a baseline to benchmark the low-accuracy direct positioning technique and/or the indirect positioning technique. Such tools to determine the benchmark based on a reference baseline help to accurately determine the benchmark.

Alternatively or additionally to relying on such a reference position data, according to a second option, can also be possible to obtain the benchmark of the accuracy of the indirect positioning technique based on a property of the location repository of the indirect positioning technique. For example, a trust level and/or a freshness of a relevant entry of the indirect positioning technique may be determined. This can help to approximate the expected error when positioning the UE using the indirect positioning technique, and thereby may allow to determine the benchmark. For example, the freshness of the relevant entry of the location repository may be low if a time duration between time of creation and current time is large. The freshness, in other words, may be a measure of how outdated the respective entry of the location repository is. For example, the trust level of the relevant entry of the location repository may be low if the corresponding entry has been populated in the offline phase using comparably unreliable tools, e.g., model-based assumptions, low-accuracy measurements, etc. Such tools to determine the benchmark based on properties of the location repository help to determine the benchmark in a simple, yet effective manner.

According to various examples, such strategies to reliably select between the low-accuracy direct positioning technique and the fingerprinting positioning technique may be taken into consideration in network deployment. For example, when deploying UEs, a certain fraction may be equipped with the high-accuracy positioning technique. This fraction F may be, e.g., in the range of 0.01-0.3; hence, the count of UEs having the capability of the high-accuracy direct positioning technique is larger than the count of UEs not having the capability of the high-accuracy direct positioning technique. Thereby, the amount of costly and complex UEs capable of the high-accuracy direct positioning technique may be limited, by dimensioning F to be small; at the same time, by dimensioning F to be sufficiently large, it can be assured that any UE not being equipped with the high-accuracy direct positioning technique has at least one UE being equipped with the high-accuracy direct positioning technique in its proximity. Thereby, the low-accuracy direct positioning technique and/or the indirect positioning technique may be benchmarked based on the high-accuracy direct positioning technique. A selection between the low-accuracy direct positioning technique and the indirect positioning technique becomes possible on said benchmarking. The high-accuracy direct positioning technique can also be used to update the location repository of the indirect positioning routine, thereby facilitating an up-to-date location repository and entries having a large freshness. For example, it can be preferable to equip those UEs with the capability of positioning using the high-accuracy direct positioning technique which have a comparably large mobility; this increases the likelihood that the benchmark based on the high-accuracy direct positioning technique is available to a respective UE within a certain time duration.

FIG. 1 illustrates aspects with respect to a system 100. The system 100 includes multiple UEs 101-104. The system 100 includes APs 107, 108 of a wireless network. The wireless network may implement communication functionality for at least some of the UEs 101-104. Example wireless networks include: Bluetooth low energy; ultra-wideband communication; IEEE Wi-Fi; 3GPP cellular networks; etc.

The system 100 also includes a server 105 that is able to communicate with the UEs 101-104. The server 105 also has a backend connection with a location repository 106, implementing a database. The location repository 106 can be used to implement an indirect positioning technique for positioning the UE 101. For example, the indirect positioning technique may include a SLAM positioning technique and/or a fingerprinting positioning technique. The indirect positioning technique uses measurements of an environmental topology of an area in which the UE 101 is arranged for comparison with entries of the location repository 106. These entries include predetermined measurements or models of the environmental topology. Examples of the indirect positioning technique are described in connection with FIG. 2.

Figure 2:
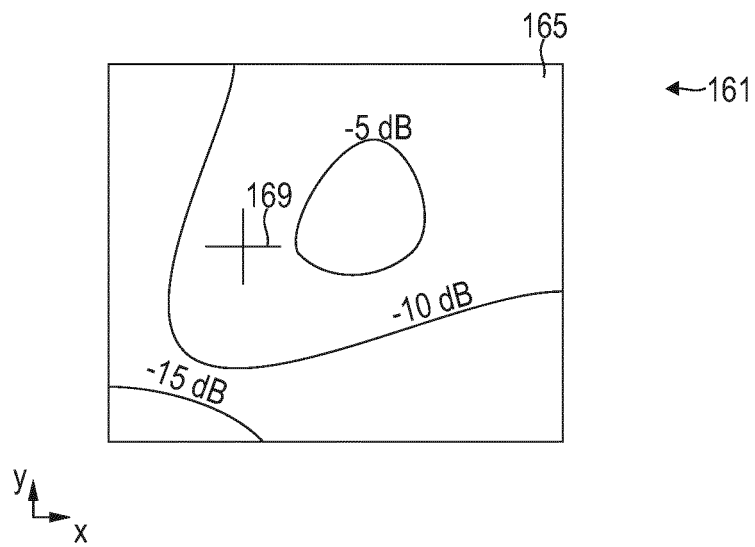
FIG. 2 schematically illustrates a mapping of RSS to location provided by the location repository of an indirect positioning technique according to various examples.

FIG. 2 illustrates aspects with respect to the indirect positioning technique 161. Illustrated in FIG. 2 is a mapping 165 of an environmental topology—in the scenario of FIG. 2, the RSS of radio frequency signals transmitted by the APs 107, 108—in a surrounding of the UE 101. Then, by taking a measurement on the RSS and comparing the measurement with predetermined measurements included in the location repository 106, it becomes possible to position the UE 101, i.e., to determine the position data indicative of the location 169 of the UE 101.

The UE 101—beyond the indirect positioning technique 161—may also make use of a direct positioning technique. Examples of the direct positioning technique are described in connection with FIG. 3.

Figure 3:
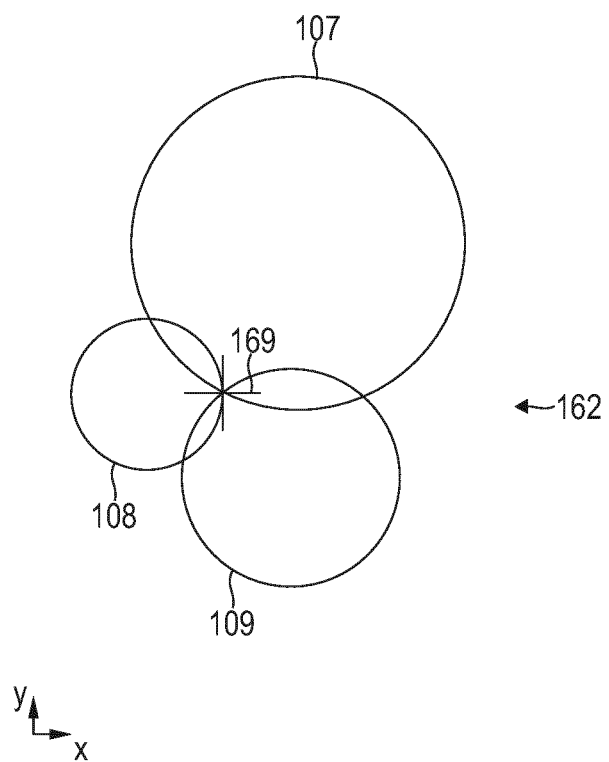
FIG. 3 schematically illustrates triangulation of a direct positioning technique according to various examples.

FIG. 3 illustrates aspects with respect to the direct positioning technique 162. FIG. 3 illustrates a triangulation of radio frequency signals transmitted by the APs 107-109. Based on time of flight ranging and/or angle of arrival measurements, the position data indicative of the location 169 of the UE 101 can be determined. A-priori knowledge on the environment of the UE 101 is not required such that ab initio measurements become possible. A technology such as Bluetooth low energy, WiFi, or UWB may be used.

Figure 4:
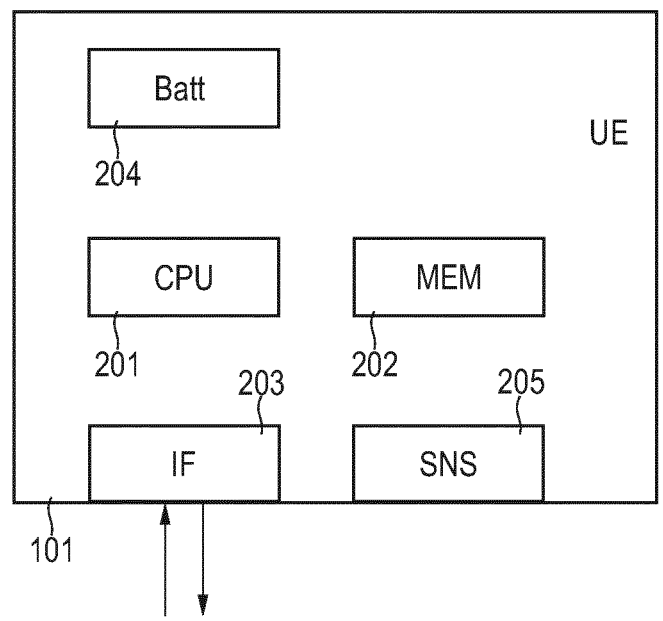
FIG. 4 schematically illustrates a UE according to various examples.

FIG. 4 illustrates aspects with respect to the UE 101. The UE 101 includes control circuitry implemented by a processor 201, a memory 202, and an interface 203. The processor 201 can load program code stored by the memory 202 to perform techniques as described herein, e.g., with respect to positioning of the UE 101 by using an indirect positioning technique and/or a direct positioning technique; selecting between the indirect positioning technique and/or the direct positioning technique; determining a benchmark of the indirect positioning technique and/or the direct positioning technique; etc. The interface 203 may implement communication capability. For example, device to device communication with one or more UEs 102-104 in the proximity of the UE 101 can be implemented via the interface 203, using radio frequency signaling or another technique, e.g., ultrasound, etc. Further, uplink communication and/or downlink communication with a network via the APs 107-109 can be implemented via the interface 203. Further, uplink communication and/or downlink communication with the server 105 can be implemented; such communication with the server 105 may be higher-layer communication implemented via a lower layer of a transmission protocol stack provided by the APs 107-109.

In the scenario FIG. 4, the UE 101 also includes a battery 104. The battery 204 provides power for operation of the UE 101.

In the scenario of FIG. 4, the UE 101 also includes a sensor 205—which is, however, generally optional. The sensor 205 can be used to make measurements on the environmental topology when using the indirect positioning technique 161. For example, in connection with an SLAM positioning technique, the sensor 205 may be implemented by one or more of the following: camera; LIDAR ranging; ultrasound ranging; etc. In other examples, the indirect positioning technique may be facilitated based on measurements that can be taken by the interface 203, e.g., RSS measurements on radio frequency signals communicated between the UE 101 and one or more of the APs 107-109.

For example, the UE 101 may be one or more of the following: a smartphone; a wearable device such as a smart watch; a positioning tag; and Internet of Things device; etc.

Figure 5:
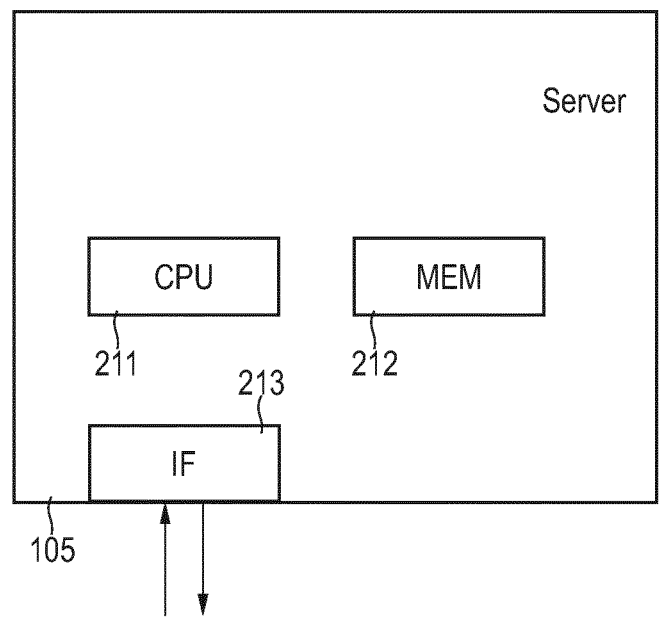
FIG. 5 schematically illustrates a server according to various examples.

FIG. 5 illustrates aspects with respect to the server 105. The server 105 includes control circuitry implemented by a processor 211, a memory 212, and an interface 213. The processor 211 can load program code stored by the memory 212 to perform techniques as described herein, e.g., with respect to positioning of the UE 101 using an indirect positioning technique; retrieving entries from the location repository 106; mapping measurements of an environmental topology with the entries of the location repository 106 when using the indirect positioning technique; selecting between the indirect positioning technique and/or the direct positioning technique for positioning of the UE; and determining a benchmark of the indirect positioning technique and/or the direct positioning technique; etc. The interface 213 is for communication between the server 105 and the location repository 106. Also, the interface 213 is for communication between the server 105 and the UE 101, as well as for communication between the server 105 and one or more of the UEs 102-105.

Figure 6:
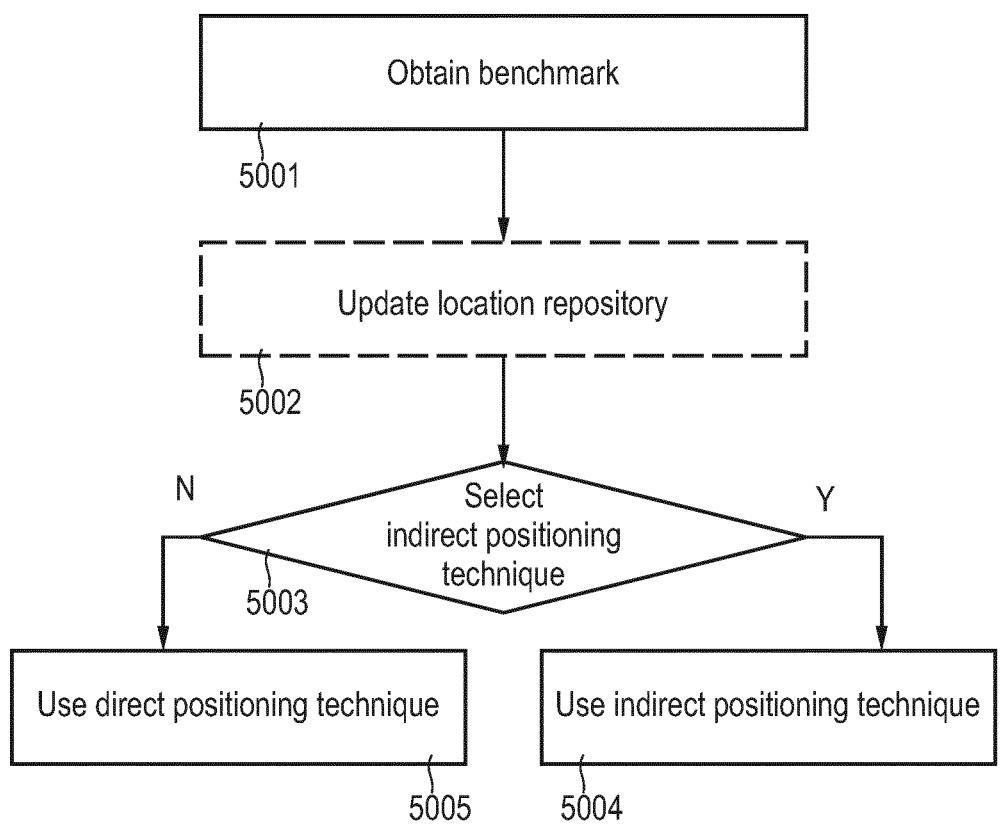
FIG. 6 is a flowchart of a method according to various examples.

FIG. 6 is a flowchart of a method according to various examples. For example, the method of FIG. 6 may at least partly be executed by the control circuitry 201-203 of the UE 101. Alternatively or additionally, the method of FIG. 6 may at least partly be executed by the control circuitry 211-213 of the server 105.

The method of FIG. 6 illustrates aspects with respect to selecting between an indirect positioning technique (cf. indirect positioning technique 161 in FIG. 2) and a direct positioning technique (cf. direct positioning technique 162 in FIG. 3).

Initially, at block 5001, a benchmark is obtained. The benchmark is for an accuracy of the indirect positioning technique and/or for an accuracy of the direct positioning technique. For example, the benchmark may include a measure of how accurate/inaccurate the indirect positioning technique and/or the direct positioning technique is. For example, the benchmark may, e.g., include an indicator indicative of the reliability of positioning using the direct positioning technique and/or using the indirect positioning technique, e.g., expressed in centimeters or meters or degrees, etc. For example, the benchmark may, e.g., include an indicator indicative of the error margins associated with positioning using the direct positioning technique and/or using the indirect positioning technique, e.g. express in centimeters or meters or degrees, etc.

As a general rule, various options are available for obtaining the benchmark in block 5001. In a first option, the benchmark may be obtained by determining at least one of a trust level and a freshness of an entry of a location repository of the indirect positioning technique. For example, the respective entry may be identified based on a mapping between a measurement of an environmental topology taken by the UE and candidate entries of the location repository. Then, if the freshness indicates an outdated or old entry, a limited accuracy may be assumed in connection with the benchmark. Alternatively or additionally, if the trust level indicates an entry of limited reliability, a limited accuracy may be assumed in connection with the benchmark.

Another option for obtaining the benchmark in block 5001 involves reference position data. Here, it would be possible to obtain first reference position data for the respective UE to be positioned using a further direct positioning technique. The further direct positioning technique may have a higher nominal accuracy than the direct positioning technique; hence, the first reference position data can be an appropriate baseline for obtaining the benchmark by comparison with second reference position data obtained using the indirect positioning technique. The direct positioning technique may be referred to as low-accuracy direct positioning technique; while the further direct positioning technique may be referred to as high-accuracy direct positioning technique. For example, if there is a significant deviation between a location indicated by the first reference position data and a location indicated by the second reference position data, this can be used as an indication of a limited accuracy of the indirect positioning technique.

Alternatively or additionally, it would also be possible to compare the first reference position data obtained using the high-accuracy direct positioning technique with third reference position data for the UE obtained using the low-accuracy direct positioning technique, to obtain the benchmark of the accuracy of the direct positioning technique.

In such a scenario, based on the first reference position data, typically a high-accuracy positioning of the UE is available. Hence, at optional block 5002, it would be possible to update the location repository of the indirect positioning technique based on the first reference position data. This helps to provide an up-to-date location repository; the location repository can be updated using the high-accuracy direct positioning technique. The location repository can be continuously populated.

In some scenarios, it would not be required to implement a dedicated offline phase to populate the location repository and preceding an online phase enabling positioning of UEs using the respective indirect positioning technique; rather, population of the location repository could be implemented on-the-fly, based on the first reference position data. Then, a scenario may occur where there is no appropriate entry available, because the location repository has not yet been populated in the respective area: this may lead to the benchmark obtained at block 5001 to indicate unavailability of the indirect positioning technique, corresponding to zero accuracy of the indirect positioning technique.

At block 5003, a selection between the indirect positioning technique and the direct positioning technique is implemented. This selection at block 5003 is implemented taking into account the benchmark obtained at block 5001. For example, if the benchmark is indicative of the limited accuracy of the indirect positioning technique—e.g., due to a sparsely populated location repository, and/or due to limited freshness of the location repository, and/or due to limited trust level of the location repository, and/or due to large deviations between the first and second reference position data—then, the direct positioning technique may be selected. Likewise, if the benchmark is indicative of a limited accuracy of the direct positioning technique, then the indirect positioning technique may be selected.

In the selection of block 5003, further decision criteria may be taken into account beyond the benchmark obtained at block 5001. A further decision criterion that may be taken into account in block 5003 includes the location of the mobile device. For example, the location of the mobile device may be roughly approximated using an appropriate positioning technique, e.g., a positioning technique that is also employed in connection with obtaining the benchmark at block 5001. It would also be possible to rely on a-priori knowledge of the location of the UE, e.g., obtained from previous positioning. Then, it can be checked whether the location is within a certain predefined area or close to a predefined landmark. This is based on the finding that high accuracy positioning of the UE may be required in certain scenarios, e.g., within densely populated urban areas; while in other scenarios less accurate positioning of the UE may be sufficient. Then, based on the location, the selection between the direct positioning technique and the indirect positioning technique can be made to fulfil such needs for high accuracy/low accuracy.

A still further decision criteria that may be taken into account at block 5003—beyond the benchmark obtained in block 5001—is the state of charge of the battery of the UE to be positioned. This is based on the finding that, typically, the direct positioning technique and the indirect positioning technique are associated with different levels of energy consumption. Then, if a low state of charge of the battery of the UE is detected, it can be appropriate to select the positioning technique which provides for low energy consumption.

If at block 5003 it is judged that the indirect positioning technique is not selected, then, at block 5005 the direct positioning technique is used for positioning the UE. Differently, if at block 5003 it is judged that the indirect positioning technique is selected, then, at block 5004, the indirect positioning technique is used for positioning the UE. Hence, a selective activation of the indirect positioning technique and the indirect positioning technique is implemented.

Figure 7:
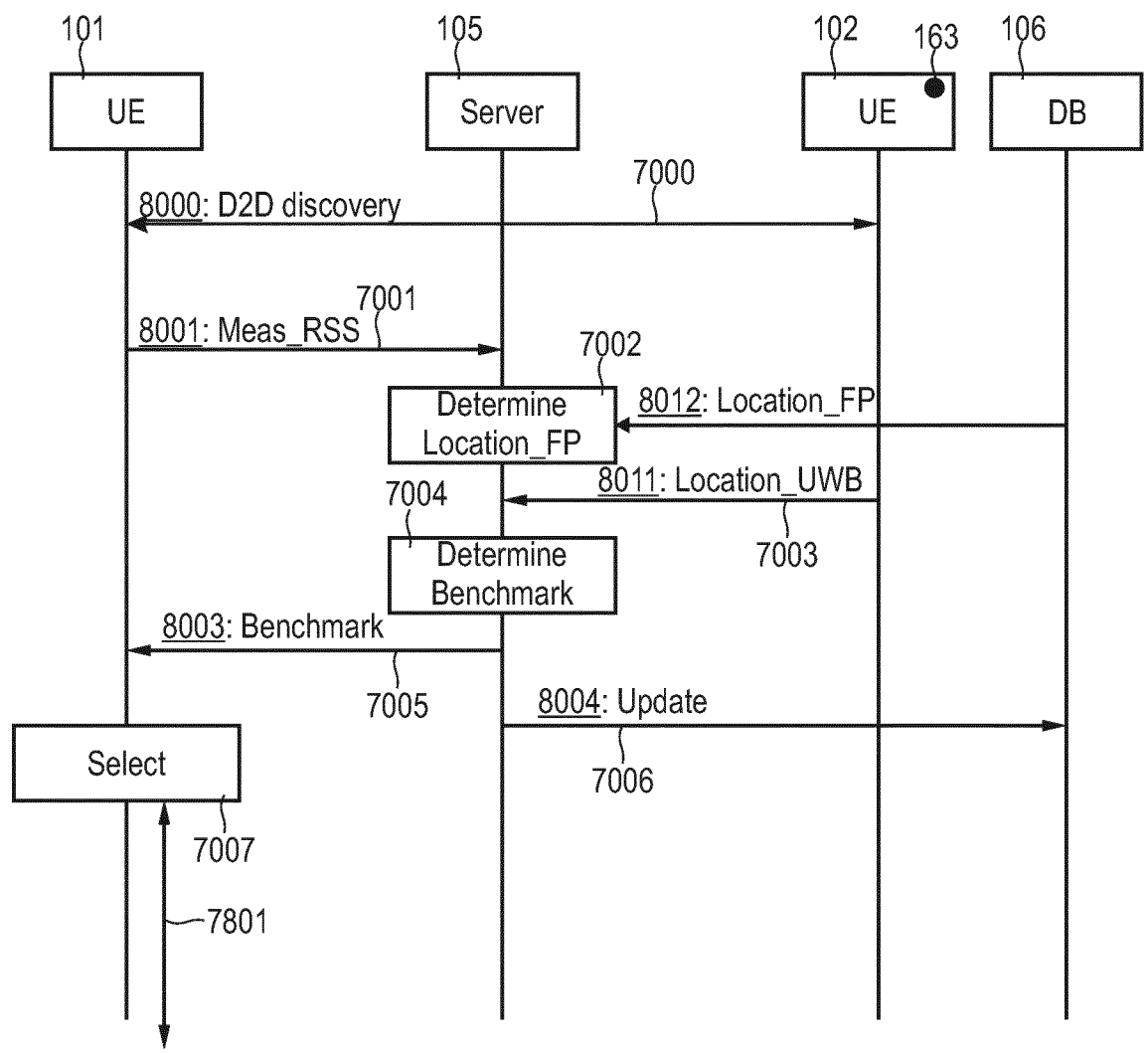
FIG. 7 is a signaling diagram of communication between UEs, the server, and the location repository according to various examples.

FIG. 7 illustrates aspects with respect to obtaining a benchmark of the accuracy of the direct positioning technique 162 and the indirect positioning technique 161. FIG. 7 is a flowchart of communication between the UE 101, the server 105, the UE 102, and the database 106.

In the scenario of FIG. 7, the UE 102 is equipped with the capability to perform high-accuracy positioning based on a high-accuracy direct positioning technique 163. This is indicated by the black dot (also cf. FIG. 1). The nominal accuracy of the high-accuracy direct positioning technique 163 is larger than the nominal accuracy of the low-accuracy direct positioning technique 162.

Initially, at 7000, device-to-device (D2D) control signaling 8000—e.g., for discovery—is implemented between the UE 101 and the UE 102. This helps to determine that the UE 102 is arranged in proximity of the UE 101. Here, proximity may correspond to any position data obtained by the high-accuracy direct positioning technique 163 of the UE 102 being of significance also for positioning of the UE 101 using the low-accuracy direct positioning technique 162 and/or the indirect positioning technique 161. Hence, proximity may correlate with a spatial resolution of the direct positioning technique 162 and/or a spatial resolution of the indirect positioning technique 161 employed by the UE 101.

In other terms, proximity may correlate with the accuracy of the direct positioning technique 162 and/or the accuracy of the indirect positioning technique 161. For example, if the indirect positioning technique 161 provides for a spatial resolution of 1-2 m, then, the D2D control signaling 8000 may help to identify that the UE 101 and the UE 102 have a distance in the same order of magnitude, i.e., a located in proximity of each other.

Next, at 7001, a control message 8001 indicative of a RSS—measured by the UE 101, e.g., using WiFi or Bluetooth low-energy technology—is transmitted by the UE 101 and received by the server 105. For example, the RSS of signals transmitted by one or more of the APs 107-109 may be measured (cf. FIG. 1).

The RSS is used for positioning of the UE 101 using the fingerprinting positioning technique 161. For this, the server 105, at 7002, accesses the location repository 106 to map the measured RSS with a plurality of entries of the location repository 106. A fitting entry of the location repository 106 is retrieved. Specifically, reference position data 8012 for the UE 101 is received from the location repository 105 and hence obtained using the indirect positioning technique 161.

Next, at 7003, reference position data 8011 is transmitted by the UE 102 and received by the server 105. In the example of FIG. 7, a UWB technology is used by the high-accuracy positioning technique 163. Dedicated APs may be relied upon for corresponding measurements. Also, RSS or angle-of-arrival etc. may be measured.

The reference position data 8011 is obtained based on positioning measurements taken by the UE 102 using the high-accuracy direct positioning technique 163. The reference position data 8011 is primarily indicative of the location of the UE 102. However, because—based on 7000—it is known that the UE 101 and the UE 102 are arranged in the proximity with respect to each other, the reference position data 8011 is also indicative of the location of the UE 101. Positioning of the UE 102 is also of significance for positioning of the UE 101.

The reference position data 8011 has a comparably high accuracy, because the high-accuracy direct positioning technique 163 available to the UE 102 is employed. Hence, the reference position data 8011 is suitable to serve as a baseline to benchmark the reference position data 8012 obtained using the fingerprinting positioning technique 161. This is done at 7004, by comparing the reference position data 8011 and the reference position data 8012. Large deviations can indicate a limited accuracy of the fingerprinting positioning technique.

Next, a downlink control message 8003 is transmitted by the server 105 and received by the UE 101 at 7005. The downlink control message 8003 is indicative of the benchmark determined at 7004. Hence, at 7005, the UE 101 obtains the benchmark. The UE can then select, at 7007, between using the indirect positioning technique 161 and using the direct positioning technique 162 for positioning (cf. FIG. 6, block 5003). Because, in the scenario of FIG. 7, the selection is implemented at the UE 101, it is possible to take UE-centric decision criteria into account when selecting, e.g., the state of charge of the battery 101.

However, in other scenarios, it would also be possible that the selection at block 7007 is implemented by the server 105 and that then the result of the selection is signaled to the UE 101.

As will be appreciated, in the scenario FIG. 7, the benchmark is determined at block 7004 by the involvement of the UE 102, mediated by the server 105. It is not required that in all scenarios the server 105 is involved. Rather, it would be conceivable that the first reference position data 8011 is communicated from the UE 102 to the UE 101 using D2D communication, without involvement of the server 105 (not illustrated in FIG. 7). This facilitates UE-centric decision logic for the selection.

Further, as will be appreciated from FIG. 7, due to the involvement of the UE 102 in benchmarking of the indirect positioning technique 161 used for positioning of the UE 101, there may be a tendency that the reference position data 8011 is less available than the reference position data 8012. For example, a scenario may be encounter where the UE 102—or any further UE 104 equipped with the high-accuracy direct positioning technique 163—is not located in the proximity of the UE 101. For this reason, it would be possible that a first repetition rate at which the reference position data 8011 is obtained is smaller than a second repetition rate at which the reference position data 8012 is obtained. For example, scenarios are conceivable in which no UE 102, 104 having the ability of high-accuracy positioning using the high-accuracy positioning technique 163 is arranged in the proximity of the UE 101. For example, deployment scenarios are conceivable in which a limited count of UEs 102, 104 having the capability of the high-accuracy direct positioning technique 163 are used, in particular if compared to conventional UEs 101, 103 not having the capability of the high-accuracy direct positioning technique 163.

To attribute for the limited repetition rate/availability of the reference position data 8011, it would be possible that the selection taken at 7007 has a certain temporal validity 7801. While the selection is valid, i.e., during the temporal validity 7801, it would then be possible to repeatedly determine position data indicative of the location of the UE 101 using the selected positioning technique 161, 162—e.g., without newly benchmarking, but by rather relying of the benchmark of 7004.

FIG. 7 also illustrates that it would be possible to update in entry of the location repository 106 based on the reference position data 8011, by providing a respective update control message 8004 at 7006. Thereby, the high-accuracy direct positioning technique 163 can be used to populate/update the location repository 106; thereby resulting in a higher accuracy also for the fingerprinting positioning technique 161.

Figure 8:
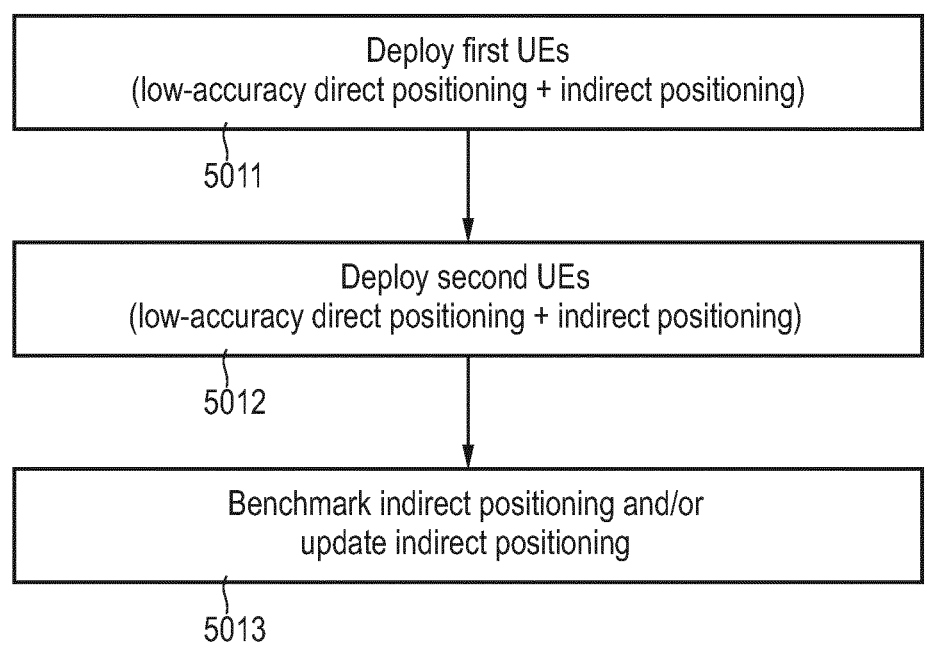
FIG. 8 is a flowchart of a method according to various examples.

FIG. 8 is a flowchart of a method according to various examples. FIG. 8 illustrates a method of operating a system, e.g., the system 100 of FIG. 1.

FIG. 8 illustrates aspects of deployment of a first plurality of UEs configured to employ a low-accuracy direct positioning technique and an indirect positioning technique, block 5011 (cf. FIG. 1, UEs 101, 103; cf. FIG. 2 for indirect positioning technique 161; and cf. FIG. 3 for low-accuracy direct positioning technique 162), and which further rely on deployment of a second plurality of UEs configured to employ a further direct positioning technique having a nominally higher accuracy if compared to the direct positioning technique, block 5012 (cf. FIG. 1, UEs 102, 104 being capable of the high-accuracy direct positioning technique 163). It is then possible to benchmark the direct positioning technique and/or the indirect positioning technique based on the high-accuracy direct positioning technique. A selection between positioning of the UEs of the first plurality of UEs can be implemented based on said benchmarking, block 5013 (cf. FIG. 7: 7004, 7005, 7007). Alternatively or additionally to such benchmarking, it would also be possible to update a location repository of the indirect positioning technique based on the indirect positioning technique (cf. FIG. 7: 7006). The benchmarking can be implemented on reference position data obtained from the high-accuracy direct positioning technique, e.g., by the UEs of the second plurality of UEs repeatedly performing ultra-wideband multi-lateration.

For example, if the UEs of the first plurality of UEs employ Bluetooth low energy as the technology for the low-accuracy direct positioning technique, then, the UEs of the second plurality of UEs may employ UWB as the technology for the high-accuracy direct positioning technique. Generally, different technologies may be employed by the low-accuracy direct positioning technique and the high-accuracy direct positioning technique.

Such techniques are based on the finding that UEs equipped with the high-accuracy direct positioning technique such as UWB are typically much more expensive and have a higher battery consumption if compared to UEs equipped with the low-accuracy direct positioning technique. On the other hand, costs and energy consumption is typically not a problem where a limited count of UEs of the second plurality of UEs is deployed, while the majority of UEs of the first plurality use a conventional, low-accuracy direct positioning technique. An example use case for deployment could be where hundreds or thousands of UEs of the first plurality of UEs including Bluetooth low energy tags are deployed; while there are only 10 UEs of the second plurality of UEs having the capability of the high-accuracy direct positioning technique. As a general rule, the count of the first plurality of UEs may be larger than the second plurality of UEs.

Further, it would be possible that the UEs of the second plurality of UEs correspond to high-mobility UEs that move around frequently in the whole coverage area of the system. This helps to provide for the ability of benchmarking at a comparably high repetition rate for any location within the coverage area.

As will be appreciated from the above, by using the high-accuracy direct positioning technique, after a certain time, enough mapping points will be measured to get an accurate fingerprint of the coverage area. Since the high-accuracy direct positioning technique can be continuously/repeatedly applied, this mapping is updated and, thereby, changes in the environment can be tracked. Since the benchmarking is repeatedly obtained based on the high-accuracy direct positioning technique, an accurate and up-to-date selection between the low-accuracy direct positioning technique and the indirect positioning technique can be made for the UEs of the first plurality of UEs.

For example, the high-accuracy direct positioning technique can be used to determine high-accuracy position data for relevant subareas of the coverage area e.g. very important persons, costly objects, etc.

The techniques described herein also facilitate rollout of the indirect positioning technique. For example, an offline training phase of the indirect positioning technique to populate the location repository may not be required. For example, initially, the UEs of the first plurality may rely on the low-accuracy direct positioning which does not require a-priori knowledge on the environment, but rather facilitates ab initio measurements for positioning. Mapping/training is not required for the low-accuracy direct positioning. Only when the benchmark indicates a better result with the indirect positioning technique if compared to the accuracy of the low-accuracy direct positioning technique, the indirect positioning technique can be selected. Therefore, positioning for the UEs of the first plurality of UE can commence directly, no offline training phase of the indirect positioning technique is required.

Furthermore, temporary unavailability of the benchmarking by means of the high-accuracy direct positioning technique is acceptable. This is because the low-accuracy direct positioning technique can be used as a fallback, e.g., if the freshness of entries of the location repository of the indirect positioning technique deteriorates due to the unavailability of the benchmarking.

The flexible selection between the low-accuracy direct positioning technique and the indirect positioning technique helps to tailor positioning to varying conditions typically encountered at large coverage areas.

While above various aspects have been described with respect to the figures, these aspects are examples only and modifications will become apparent to the skilled person upon reading and understanding of the present disclosure.

For illustration, above, various scenarios have been described in which a benchmark of the accuracy of an indirect positioning technique, such as a fingerprinting positioning technique, is obtained. Then, based on this benchmark of the accuracy of the indirect positioning technique, a selection between the indirect positioning technique and a direct positioning technique is implemented. However, in various scenarios, it would be possible to obtain—in addition or instead of the benchmark of the accuracy of the indirect positioning technique—a benchmark of the accuracy of the direct positioning technique to be used as a decision criterion for the selection.

For further illustration, while various scenarios have been described with respect to selection between a direct positioning technique and an indirect positioning technique, similar techniques may be readily applied to selection between various kinds and types of positioning techniques. For example, a selection between positioning techniques employing different technologies, such as UWB and WiFi, may be employed.

The invention claimed is:

1. A method, comprising:
obtaining a benchmark of an accuracy of at least one of a direct positioning technique or an indirect positioning technique for positioning of a mobile device;
obtaining first reference position data for the mobile device using a further direct positioning technique;
obtaining second reference position data for the mobile device using the indirect positioning technique;
comparing the first reference position data and the second reference position data to obtain the benchmark of the indirect positioning technique; and
depending on the benchmark, selecting between positioning of the mobile device using the direct positioning technique or the indirect positioning technique,
wherein the further direct positioning technique has a higher nominal accuracy than the direct positioning technique.

2. The method of claim 1,
wherein the first reference position data is obtained for the mobile device at a first repetition rate,
wherein the second reference position data is obtained for the mobile device at a second repetition rate, and
wherein the first repetition rate is less than the second repetition rate.

3. The method of claim 1, further comprising:
updating an entry of a location repository of the indirect positioning technique based on the first reference position data.

4. The method of claim 1, further comprising:
determining at least one of a trust level or a freshness of an entry of a location repository of the indirect positioning technique to obtain the benchmark.

5. The method of claim 1,
wherein said selecting between positioning of the mobile device using the direct positioning technique and the indirect positioning technique further depends on a location of the mobile device.

6. The method of claim 1,
wherein said selecting between positioning of the mobile device using the direct positioning technique or the indirect positioning technique further depends on a state of charge of a battery of the mobile device.

7. The method of claim 1,
wherein the indirect positioning technique uses measurements of an environmental topology for comparison with entries of a location repository comprising predetermined measurements or models of the environmental topology.

8. The method of claim 1,
wherein the indirect positioning technique is selected from a group comprising Simultaneous Localization and Mapping (SLAM) and fingerprinting.

9. The method of claim 1,
wherein the direct positioning technique uses ab-initio positioning measurements selected from a group comprising time-of-flight, pathloss, and angle-of-arrival.

10. The method of claim 1,
wherein the direct positioning technique uses a technology selected from a group comprising Bluetooth low-energy, ultra-wideband, and WiFi.

11. A method, comprising:
obtaining a benchmark of an accuracy of at least one of a direct positioning technique or an indirect positioning technique for positioning of a mobile device;
obtaining first reference position data for the mobile device using a further direct positioning technique;
obtaining second reference position data for the mobile device using the indirect positioning technique;
comparing the first reference position data and the second reference position data to obtain the benchmark of the indirect positioning technique; and
depending on the benchmark, selecting between positioning of the mobile device using the direct positioning technique or the indirect positioning technique,
wherein the first reference position data is obtained based on positioning measurements taken by at least one further mobile device located in proximity of the mobile device.

12. A device comprising control circuitry configured to perform operations comprising:
obtaining a benchmark of an accuracy of at least one of a direct positioning technique or an indirect positioning technique for positioning of a mobile device,
obtaining first reference position data for the mobile device using a further direct positioning technique;
obtaining second reference position data for the mobile device using the indirect positioning technique;
comparing the first reference position data and the second reference position data to obtain the benchmark of the indirect positioning technique;
updating an entry of a location repository of the indirect positioning technique based on the first reference position data; and
depending on the benchmark, selecting between positioning of the mobile device using the direct positioning technique or the indirect positioning technique.

* * * * *